Patented Feb. 8, 1949

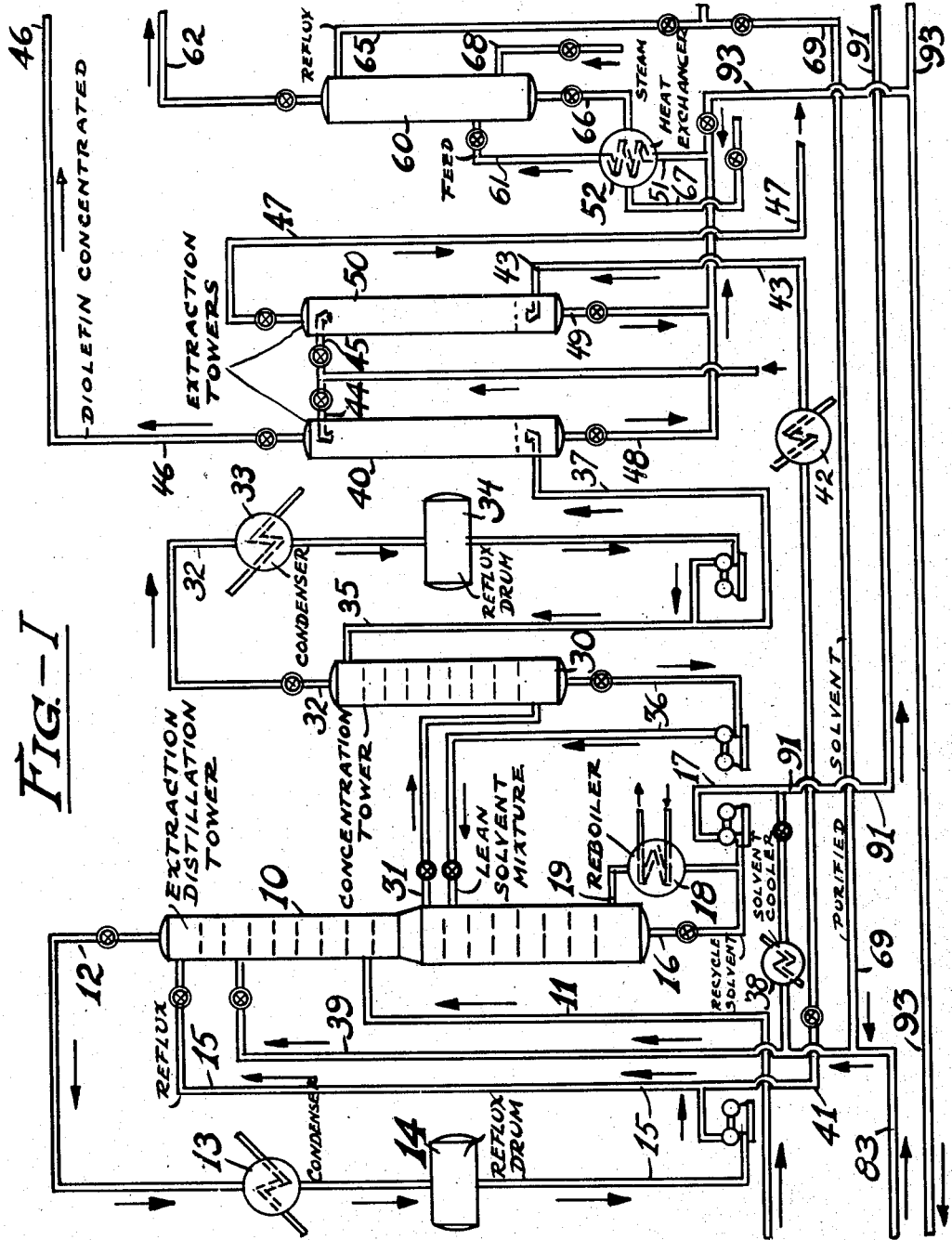

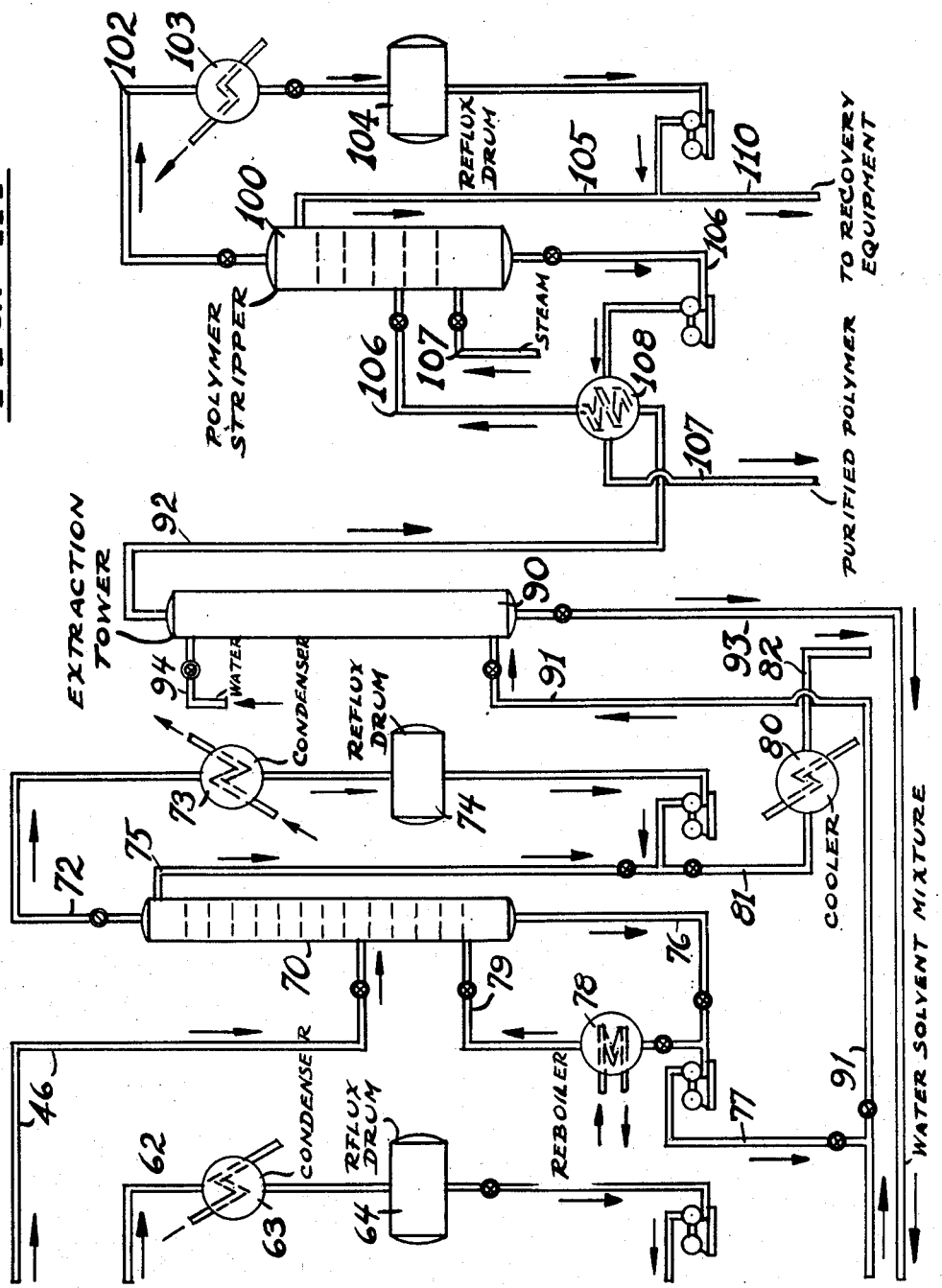

2,461,346

UNITED STATES PATENT OFFICE 2,461,346

SEPARATION OF HYDROCARBONS

John A. Patterson, Beverly, N. J., assignor to Standard Oil Development Company, a corporation of Delaware Application December 28, 1944, Serial No. 570,193

1 Claim. (Cl. 260—681.5)

This invention relates to the separation of constituents of complex hydrocarbon mixtures by solvent distillation. It relates particularly to the maintenance of desired solvent purity by the extraction from solvent concentrates of high boiling compounds, particularly dicyclopentadiene, formed in the course of processing to separate diolefins from admixture with monoolefins and paraffins of about the same boiling range.

Hydrocarbons difficult to separate from complex mixtures by ordinary distillation can often be separated by vapor phase extraction or extractive distillation. In such processing, a selective solvent for one or a related series of compounds is passed down a fractionation tower. In the presence of the solvent, the hydrocarbons selectively dissolved are carried down with the solvent as a solution to a lower portion of the tower, while the less soluble compounds continue upwards and finally are separated as overhead products. The solvents usually employed are those which have selectivity for the more unsaturated hydrocarbons. Such hydrocarbons are therefore subjected to a prolonged heating effect and consequently undergo deterioration, especially polymerization, to form liquid and solid complexes which normally concentrate in the solvent.

Of the polymers so produced, the formation of the liquid compounds is not substantially reduced by the addition of inhibitors effective in checking the formation of the more complex solid compounds. The high boiling polymers, being soluble in the solvent, reduce its selectivity, complicate process control and add mechanical difficulties, especially as to the operation of heat exchangers and valves. The separation of these liquid polymers from the solvent by distillation is furthermore complicated by reason of the formation of azeotropes. In commercial processing, these adverse effects must be obviated or minimized to permit good processing.

In the extractive distillation of narrow boiling petroleum distillates to obtain selectively the $C_5$ hydrocarbons, the solvent forms azeotropic mixtures with the olefin and residual $C_5$ fractions. Water washing of the solvent extracts furnishes a practical and convenient method of separating the hydrocarbons from these solutions and also of recovering the solvent itself. However, when the solvent-polymer mixture is treated with water, emulsion difficulties are often encountered because of density relationships. By mixing certain of the $C_5$ azeotropic mixtures with a solvent bleed fraction, however, extraction of the solvent can be made without emulsion difficulties. This advantage is attained without the use of any additional water-scrubbing equipment over that required to treat the various extractive fractions.

The present invention thus relates to a method of removing the liquid polymers and, as a feature of processing, the maintenance of liquid polymer concentration in the solvent below the level at which a disadvantageous processing effect is encountered.

It is an object, therefore, of the invention to effect separation of individual compounds from complex hydrocarbon mixtures, especially of the $C_5$ hydrocarbons, by processing involving solvent distillation made particularly advantageous by reason of maintaining satisfactory solvent purity and a continuous elimination of high boiling polymers which are the source of solvent contamination. Other objects will be apparent from the following description and illustration of the invention.

Thus, in the extractive distillation process for the separation of isoprene from refinery cracked stocks, it has been found that dicyclopentadiene is the main constituent of the liquid polymeric material. This dimer occurs in substantial proportions in the solvent after stripping, and, unless immediately removed, is recycled to the extractive distillation tower. As a particular embodiment of this invention, the dimer is removed from the solvent such as acetone by continuously bleeding a small portion of the solvent stream into a water extractor in which the solvent dissolves and the polymers are rejected, the amount of polymer build-up in the system thus being readily controlled by adjusting the quantity of solvent bled to the water extractor. In the purification of $C_5$ diolefins, the present invention finds particularly advantageous application. The solvent bleed is mixed with spent $C_5$ fraction azeotropic mixtures before it enters the water scrubber and polymer from the solvent leaves the system in the spent $C_5$ cut. The dilute acetone solution in water is combined with the similar solution from the $C_5$ diolefin water scrubber and the acetone is recovered by distillation from the combined stream. The water content of the solvent in the system can thus be adjusted by varying the content of water in the overhead from the solvent distillation tower.

The liquid polymeric material, largely dicyclopentadiene, is also present in substantial amounts in the final fractionator bottoms. Usually the dicyclopentadiene is discarded because the concentrations in the stripped solvent and in the final fractionator bottoms are too small to justify recovery. These rejections of dicyclopentadiene are losses from the commercial viewpoint since the material is important in the preparation of plastics. It is an added feature, therefore, of this invention to combine these sources of dicyclopentadiene and to recover this compound. The invention is therefore concerned, in the processing with regard to the C₅ hydrocarbons, with the removal of liquid polymeric materials in the segregation and purification of the respective paraffins and olefins, and at the same time recovering the valuable commercial product, dicyclopentadiene.

The invention in regard to the separation and purification of isoprene from refinery cracked stocks and recovery of dicyclopentadiene finds embodiment in combining a portion of the recycle solvent stock from the extractive distillation unit with the product fractionator bottoms and then water-washing the combined streams to remove the contained solvent. The C₅ hydrocarbons are then separated from the polymeric material by steam stripping. By such processing, essentially all of the polymer, mainly dicyclopentadiene, in the system for the separation and recovery of diolefin hydrocarbons from complex hydrocarbon mixtures is obtained in concentrated form. By such processing, therefore, dicyclopentadiene becomes a by-product in the process for the separation and purification of individual C₅ hydrocarbons from complex petroleum mixtures.

In order to present a detailed understanding of the invention, the following description of processing is presented. The reference numerals given in the description refer to the accompanying drawing. In this drawing a suitable layout of equipment and indication of a suitable flow of materials for processing according to the invention are presented. In the illustration, example will be taken of the separation and purification of isoprene by the treatment of a close boiling fraction of composition:

|  | Percent |
|---|---|
| C₄ hydrocarbons | 2.6 |
| 3-methyl butent-1 | 2.6 |
| Pentene-1 | 49.9 |
| 2-methyl butene-1 | 10.4 |
| Isoprene | 19.9 |
| Trans pentene-2 | 2.1 |
| n-pentane | 5.8 |
| Cis pentene-2 | 2.9 |
| 2-methyl butent-2 | 2.9 |
| Cyclopentadiene | 0.6 |
| Cis and trans piperylene | 0.3 | obtained as a distillate from a debutanized distillate from the vapor phase steam cracking of a virgin gas oil.

This hydrocarbon mixture is passed to an extractive distillation tower 10 in which a liquid solvent is employed to yield vapor and liquid fractions. This extractive distillation may be carried out in any of the usual forms of fractionating equipment, such as a tower filled with packing of refractory materials or a tower constructed in the same manner as an ordinary fractionating tower of the bubble cap type. Usually the feed enters the tower as a vapor for reasons of economy and is then passed upwardly through the liquid phase selective solvent flowing down the tower.

In the tower, plate conditions are such that the liquid mixtures of close boiling hydrocarbons and solvents are at their boiling points and are continuously being contacted with the vapors rising upwards from the plates beneath. On account of the low volatility of the solvent relative to that of the hydrocarbon the vapors are poorer in solvent constituents and rich in the hydrocarbon compounds. By maintaining the quantity of solvent circulated to the tower constant or in a definite ratio to the amount of overhead to the tower, optimum conditions for the separation of hydrocarbons can be achieved. Also by controlling the amount of hydrocarbon reflux and consequently the reflux ratio, the degree of fractionation may be varied to obtain almost any desired quality and recovery. Solvent is recovered by water-washing from the overhead fraction in tower 50 and from the bottoms fraction in tower 40. Dilute solvent obtained in towers 40 and 50 is concentrated in tower 60 and recycled to the extraction tower 10.

The fractionating equipment 10 is specifically shown as being the tower of multi-plate construction containing bubble cap plates. In normal processing according to the invention, about 60 plates are present in such a tower. The tower is shown as being complete with an overhead vapor line 12, a condenser 13, a drum 14, a reflux line 15, a bottoms line 16, a reboiler 18 and a reboiler vapor line 19. The tower has also a solvent line 39, a side stream vapor line 31 and a side stream return line 36. The distillate product is withdrawn from the system through line 41 and the bottoms product through line 17. Pressure upon the system is maintained at about 25 lbs. per sq. in. (gauge), in order to have a workable condensing temperature.

The overhead distillate vapor removed through line 12 consists of azeotropic mixtures of C₅ olefins and paraffins when aqueous acetone is employed as the solvent material admitted through line 39. The vapors are condensed in equipment 13 and passed to the reflux drum 14. A portion of the condensate is returned through line 15 as reflux, while the remainder is withdrawn through line 41, cooled in equipment 42 and conducted through line 43 to the water scrubbing equipment 50.

The quantity of aqueous acetone admitted through line 39 to the distillation system is for the specific composition of feed stock in a volume ratio of solvent to hydrocarbon mixture of 2—1 from the point of introduction to the plate upon which the side stream is withdrawn. Below the plate from which the side stream product is withdrawn, the solvent is stripped of its hydrocarbon content.

The bottoms withdrawn through line 16 consist of relatively pure solvent. A portion of the bottoms liquid is passed through the reboiler 18 where it is vaporized, the vapors being returned to the tower 10 through the vapor line 19, to supply the heat necessary to operate the tower. The remainder of the solvent, except for a small portion withdrawn for purification, as to be further described, is conducted through line 17 to cooler 38 and then through line 39 to the upper portion of the tower 10. Thus, the major part of the solvent continuously recycles within the extractive distillation system.

The vapor side stream removed through line 31 contains a high concentration of isoprene with small amounts of other diolefins in the presence of solvent in an amount in equilibrium with a 75 molar per cent concentration of solvent on the plates of the extractive distillation tower 10. The volume of the solvent is about 50% of the vapor mixture. This side stream material withdrawn through line 31 is conducted to the base of the side stream concentrating tower 30. The tower 30 may be any suitable fractionating apparatus, such as a tower provided with bubble plates, as previously employed. The tower is provided with an overhead vapor line 32, a condenser 33, a reflux drum 34, a reflux line 35 and a bottoms line 36, in addition to the vapor inlet line 31. The vapor entering the tower 30 through line 31 supplies the heat necessary to operate the tower.

The overhead distillate removed through line 32 consists essentially of azeotropic mixtures of isoprene, acetone and water and contains in addition small quantities of piperylene, cyclopentadiene and higher boiling materials such as polymers formed during the extractive distillation operation. The vapor is condensed in equipment 33 and conducted to the drum 34. A portion of the condensate is returned to the tower 30 through line 35 as reflux, while the remainder is withdrawn through line 37 to the water scrubbing equipment 40.

The degree of separation of the hydrocarbons taking place in the extractive distillation system 10 is dependent on two functions, namely, the ratio of the solvent to hydrocarbon liquid on the plates and the ratio of liquid to vapor flowing through the tower. The ratio of solvent to hydrocarbon is controlled by the rate of solvent recirculation. The ratio of liquid to vapor in the zone of high solvent to hydrocarbon ratio, that is, between the solvent inlet and the side stream outlet, is controlled by the reflux returned through line 15 from the reflux drum 14. Due to considerable difference in solvent concentration between the top of the tower and the extractive distillation zone and the difference in latent heats of the constituents, the reflux ratio and consequently the ratio of liquid to vapor at the top of the tower must be appreciably higher than the liquid to vapor ratio in the extractive distillation zone.

In the case of the specific example, the liquid to vapor ratio in the extractive distillation zone is 0.80, while the ratio at the top of the tower is 0.85, the latter being equivalent to a reflux ratio of 5.5. The reflux ratio used in the side stream tower 30 is adjusted so as to obtain an overhead product consisting essentially of the azeotropic mixture of isoprene, acetone and water and to supply adequate reflux to the solvent stripping section of the tower 10. Whichever requires the larger amount of reflux determines the reflux ratio at the top of the tower 30. In the case cited in the example, a reflux ratio of 20 is maintained at the top of the tower 30, in order to supply adequate reflux to the bottoms solvent stripping section of the tower 10.

The heat necessary for the extractive distillation operation, as well as to concentrate the hydrocarbon fractions and to strip the solvent, is supplied completely from the single reboiler 18. In this manner, considerable heat economy is effected, since the heat to operate the extractive distillation zone in tower 10 and the diolefin concentrating side stream tower 30 are supplied by condensation of solvent at the top of the solvent stripping section of the tower. If this were not done, a condenser would have to be provided for the solvent stripper to supply the reflux necessary for operation, and additional heat would be required to operate the extractive distillation system and to effect the side stream concentration. In the same way, the condensation needed to produce the required reflux in the extractive distillation zone is obtained by supplying the heat needed to concentrate the monoolefins at the top of the tower 10.

In the operation of the system comprising towers 10 and 30 and their auxiliaries, separation into the zones indicated above is clearly defined by the various temperature zones. Thus, the vapor leaving the top of the tower 10 is at 140° F. The temperature rises sharply to 155° F. between the top of the tower and the plate on which the solvent is admitted through line 39, then very slowly reaching to 160° F. at the plate where the side stream is withdrawn through line 31. Below the plate from which the side stream is removed and as a result of the concentration of the aqueous acetone, the temperature rises sharply to 208° F., the temperature prevailing at the bottom of the tower. The temperature at the top of the side stream tower 30 is 145° F. In tower 30, the same type of temperature gradient is shown as in the concentrating section of the tower 10.

The isoprene-acetone-water azeotropic mixture removed as distillate from the tower 30 through line 32 is conducted to the water scrubbing equipment 40. Equipment 40 may be any suitable type of a liquid-liquid contacting device, in which countercurrent flow of the materials may be maintained. In the present case, the tower is packed with Raschig rings and sufficient pressure is maintained on the tower to prevent vaporization of any of the materials passing through it. The stream removed from the system through line 37 is admitted to the bottom of the tower 40 through a distributing device and then allowed to flow upward countercurrent to a stream of water admitted to the tower through line 44.

In passing through the tower, the acetone is removed and the hydrocarbon is thus completely freed of the solvent employed in the extractive distillation. The quantity of water employed is determined by the partition of the solvent between the hydrocarbon and the water and the efficiency of the extracting equipment 40. For the specific composition chosen, a volume ratio of water to distillate is approximately 1. Passing overhead from the tower 40 is partially purified isoprene in a high concentration. Impurities present in the stream consist of piperylene, cyclopentadiene, polymers and any other water-insoluble materials contained in the distillate from the tower 30. The water extract removed from the tower through line 48 consists of a dilute solution of acetone in water. This extract is combined with a similar extract from the tower 50 and treated for the recovery of the acetone solvent as to be subsequently described.

The solvent-free diolefin concentrate from the tower 40 is conducted through line 46 to the fractionating tower 70. This tower may be any suitable device for effecting a fractional distillation. For the specific composition chosen, a tower containing 50 bubble cap plates is employed. The tower 70 is provided with an overhead vapor line 72, a condenser 73, a reflux drum 74, a reflux line 75 and a bottoms withdrawal line 76, a reboiler 78 and a reboiler vapor return line 79. The distillate product is withdrawn through line 81 and the bottoms product through line 77. Pressure is maintained on the system so as to effect satisfactory condensation with ordinary water in the condenser 73. In the specific example, pressure maintained upon the tower 70 is between 12 and 15 lbs. per sq. in. (gauge).

The distillate withdrawn through line 72 consists of highly purified isoprene containing traces of piperlyene and pentenes. The distillate is condensed in equipment 73 and the condensate conducted to the reflux drum 74. A portion of condensate is returned to the tower 70 as reflux through line 75, while the remainder is withdrawn as produce through line 81. It is cooled in equipment 80 and transferred to storage through line 82.

The bottoms consisting of some isoprene, the piperlyene, cyclopentadiene, dicyclopentadiene initially present in the feed and formed during the processing, and any high boiling constituents of the feed to the tower, are withdrawn through line 76. A portion of the material is passed to the reboiler 78 where it is vaporized, the vapors being returned to the tower 70 through line 79 to supply the heat necessary to operate the tower. The remainder of the bottoms are removed through line 77 and passed through line 91. Into line 91 is also passed about 5% of the solvent withdrawn from the base of the extraction tower 10.

Equipment 90 may be any suitable type of liquid-liquid contacting device in which countercurrent flow of materials may be maintained. The tower in the present case is packed with Raschig rings and sufficient pressure is maintained therein to prevent vaporization of any of the materials passing through the tower. The stream passes through line 91 and is admitted to the bottom of the tower 90 through a distributing device and then allowed to flow upward countercurrently to the stream of water admitted to the tower through line 94. In passing through the tower, the acetone is dissolved and thus the polymer is removed from solution. The quantity of water employed is determined by the partition of the solvent between the water and the polymer and the efficiency of the contacting devices in the extracting equipment 90. For the specific composition of this invention, a volume ratio of water to distillate of approximately 1 is maintained.

The water extract removed from the tower 90 through line 93 consists of a dilute solution of acetone and water. This extract is combined with the other dilute solutions of acetone from the towers 40 and 50 and passed through heat exchanger 52 prior to passing to the tower 60 for the recovery of the acetone content.

The polymer in high concentration passes overhead from the tower 90 through line 92. Impurities present in this stream consist of cyclopentadiene and cyclopentene and any water-insoluble materials contained in the streams from towers 10 and 70. This stream passes through heat exchanger 108, through line 106, to distillation tower 100. The tower 100 is equipped with overhead vapor line 102, a condenser 103, a drum 104, a reflux line 105, a bottoms line 106 and a steam inlet line 107. The heat required to operate the tower is obtained by the passage of open steam through line 107. Taken overhead through line 102 are the impurities associated with the polymer. This stream is condensed in equipment 103 and collected in the drum 104. A portion of this condensate is returned to the tower 100 as reflux through line 105, while the remainder is passed through line 110 to be treated as desired for the recovery of any of the particular compounds. The polymer in high degree of purity is removed as the distillation residue through line 106, passed through heat exchanger 108 and thence through line 107 for collection as desired.

By increasing the number of plates in tower 70 or increasing the reflux ratio, all of the isoprene may be taken overhead as purified product. It has been found, however, more efficient to reject a small amount of isoprene to the bottoms and recycle same for recovery as described. A reflux ratio of 12 is maintained for the desired separation in the tower 70.

The distillate fraction from the tower 10 which is withdrawn through line 41, containing the azeotropic mixtures of the C$_5$ paraffins and olefins, is cooled in equipment 42 and conveyed through line 43 to the extraction tower 50. The extraction tower 50 is similar to the extraction tower 40. It is similarly packed with Raschig rings. The composite solution consisting of the C$_5$ olefins and paraffins, in addition to acetone and water, is introduced into the tower 50 near the bottom and passes upward through the tower countercurrently to a stream of water introduced near the top through line 45.

In passing through the tower, the solvent is extracted from the hydrocarbon material. The hydrocarbons freed of solvent are removed through line 47 at the top of the tower 50 and discarded. The water extract consisting of a dilute solution of acetone in water is withdrawn through line 49 at the bottom of the tower 50 and after being combined with similar extracts from the towers 40 and 90 is transferred through line 51, through heat exchanger 52 and line 61 to the solvent recovery tower 60.

Tower 60 may be any convenient device for effecting fractional distillation, such as a tower containing about 20 bubble cap plates. It is provided with an overhead vapor line 62, a condenser 63, a reflux drum 64, reflux line 65, a bottoms withdrawal line 66 and a steam line 68. The distillate product is withdrawn through line 69 and the bottoms through line 67. The distillate from the tower 60 consists of relatively pure solvent. The tower is operated at about atmospheric pressure. The distillate vapor passes through line 62 to the condenser 63 and the condensate passed to reflux drum 64. A portion of the condensate is returned to the tower 60 through line 65, while the remainder is withdrawn and transferred through line 69 to line 39 where it combines with the solvent admitted to the tower 20. Heat is supplied to the tower 60 by means of a steam line 68 through which open steam is injected directly into the bottom of the tower. The bottoms comprising the major part of the water content of the feed and the condensed steam are withdrawn through line 66 to the heat exchanger 52. The heat exchanger 52 is also utilized to heat the feed to the tower 60. Thus, the sensible heat of the bottoms is utilized.

The reflux returned to the tower 60 through line 65 is controlled at such a rate that the water content of the distillate passing through line 62 and consequently the product returned to the tower 30 through lines 69 and 39 is the same as the recycled solvent in tower 30. By proper adjustment of the reflux ratio in tower 60, the water content of the product may be varied to correct the variations in the water content of the solvent in the tower 30. Normally a reflux ratio of about 0.5 is maintained in the tower 60.

With the foregoing disclosure and illustration of the invention it will be obvious to those skilled in the art that various combinations and variations of the applications of the principles described and illustrated can be made without departing from the inventive concept and that the invention in the broad aspect comprises the unique combination of fractionally distilling and extractively distilling suitable feed stock materials for the separation of individual hydrocarbon compounds as a continuous process in which relative purity of the solvent recycle is maintained.

What is claimed is:

In a process for separating isoprene from a closely boiling mixture containing $C_5$ monoolefins, $C_5$ paraffins, isoprene and cyclopentadiene by fractional distillation in the presence of an acetone solvent in an extractive distillation zone in which the relatively saturated paraffins and monoolefins are removed as distillate, the relatively less saturated isoprene and cyclopentadiene are removed as an intermediate fraction containing solvent, the remaining solvent is removed as a bottoms fraction containing a major proportion of acetone and dicyclopentadiene formed in the extractive distillation operation, and the said intermediate fraction is redistilled to separate a distillate fraction of isoprene concentrate and a residual fraction high in acetone content and containing dicyclopentadiene formed in said redistillation step, the improved process for separating cyclopentadiene and dicyclopentadiene from said bottoms and residual fractions comprising returning the residual solvent fraction from said redistillation step to an isoprene stripping stage of said extractive distillation zone, subjecting said isoprene concentrate to a second fractional distillation in a third distillation zone to recover purified isoprene distillate therefrom, withdrawing a bottoms fraction containing cyclopentadiene and dicyclopentadiene from the said third distillation zone and combining this bottoms fraction with at least a portion of the said bottoms solvent-dicyclopentadiene fraction removed from said first extractive distillation zone and contacting these combined bottoms fractions with sufficient water to cause separation of a dilute aqueous acetone phase and a hydrocarbon phase containing said cyclopentadiene and dicyclopentadiene polymer.

JOHN A. PATTERSON.

REFERENCES CITED

The following references are of record in the file of this patent:

UNITED STATES PATENTS

| Number | Name | Date |
| --- | --- | --- |
| 2,250,925 | Babcock | July 29, 1941 |
| 2,361,493 | Patterson | Oct. 31, 1944 |
| 2,370,530 | Gage | Feb. 27, 1945 |
| 2,371,342 | Mayfield | Mar. 13, 1945 |
| 2,372,668 | Hachmuth | Apr. 3, 1945 |
| 2,372,941 | Evans et al. | Apr. 3, 1945 |
| 2,377,049 | Souders, Jr. | May 29, 1945 |

FOREIGN PATENTS

| Number | Country | Date |
| --- | --- | --- |
| 548,734 | Great Britain | Oct. 22, 1942 |